United States Patent [19]

Mikic et al.

[11] Patent Number: 4,522,310

[45] Date of Patent: Jun. 11, 1985

[54] HOUSING HOLDER AND COOPERATING DETACHABLE HOUSING

[75] Inventors: Frank Mikic; William T. Pagac, both of Kenosha, Wis.

[73] Assignee: Snap-on Tools Corporation, Kenosha, Wis.

[21] Appl. No.: 358,356

[22] Filed: Mar. 15, 1982

[51] Int. Cl.³ .............................................. F16M 13/00
[52] U.S. Cl. ................................. 220/4 R; 248/221.3; 248/313
[58] Field of Search ...................... 248/27.3, 73, 221.3, 248/222.2, 221.4, DIG. 6, 313, 316 D, 201, 466, 222.1; 220/3.9, 3.92, , 4 R, 18, 69; 312/242, 243, 204, 290, 257 A; 222/180

[56] References Cited

U.S. PATENT DOCUMENTS

| | | | |
|---|---|---|---|
| 2,460,903 | 2/1949 | Peck | 248/201 |
| 2,499,672 | 3/1950 | Nurkiewicz | 248/313 |
| 2,505,588 | 4/1950 | Smith | 248/223.3 |
| 2,703,662 | 3/1955 | Meyer | 248/27.3 |
| 2,993,503 | 7/1961 | Pokryfke | 312/242 |
| 3,037,733 | 6/1962 | Roman | 248/222.1 |
| 3,337,172 | 8/1967 | Jackson | 248/222.2 |
| 3,695,568 | 10/1972 | Hogrebe | 248/222.2 |
| 4,206,956 | 6/1980 | Lydmar | 312/257 A |

FOREIGN PATENT DOCUMENTS 1049478 2/1979 Canada ............................. 248/222.1
2046344 11/1978 Fed. Rep. of Germany ... 248/221.4

Primary Examiner—William H. Schultz
Assistant Examiner—Robert A. Olson
Attorney, Agent, or Firm—Emrich & Dithmar

[57] ABSTRACT

A housing holder adapted to be mounted securely on a support and a cooperating detachable housing capable of being quickly and easily attached and detached with respect to the holder. The holder and housing are formed of suitable plastic material, the latter having various compartments and securing means as are appropriate to the apparatus contained within the housing.

The holder and housing have cooperating engaging and interlocking integral rigid parts, while the holder also has a resilient portion including a downwardly extending latching rib, the latter cooperating in interlocking manner with an upwardly extending flange on the housing. The housing is mounted on the holder by means of "snap action" involving the resilient portion of the holder, and is detached by simple manual manipulation of the resilient portion.

2 Claims, 6 Drawing Figures

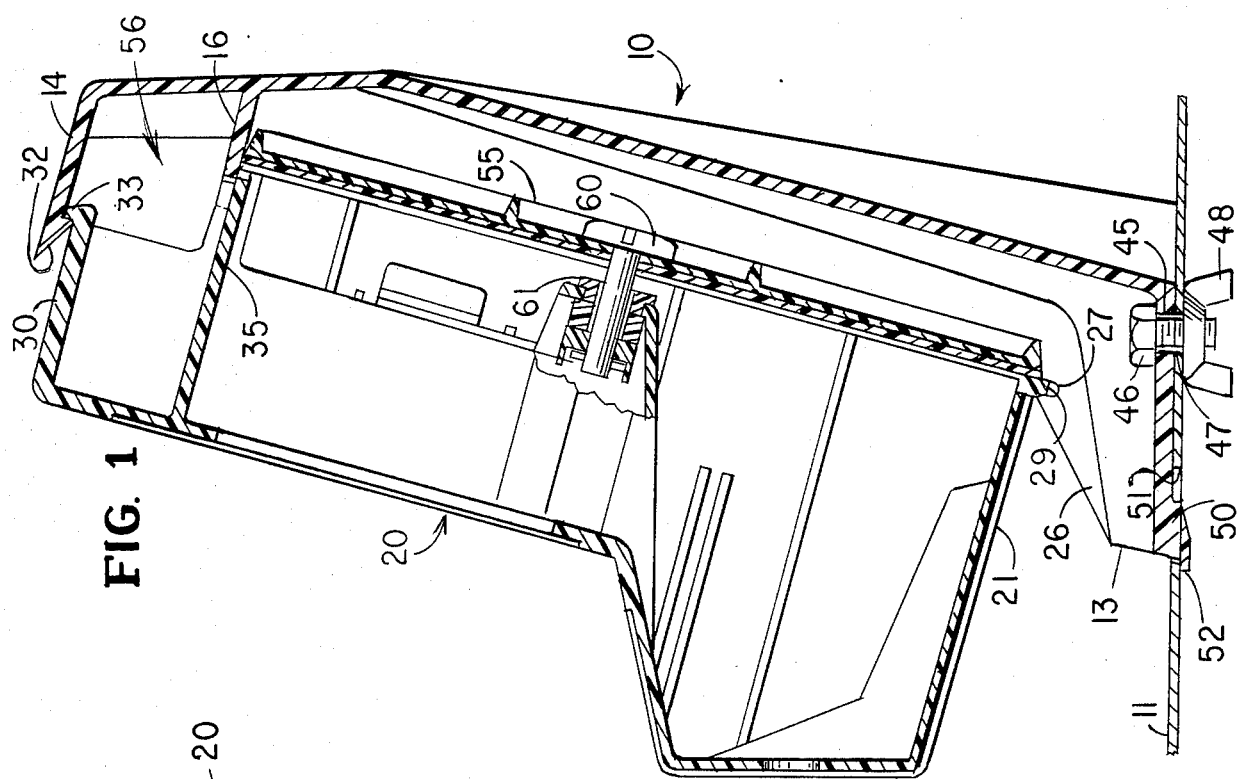
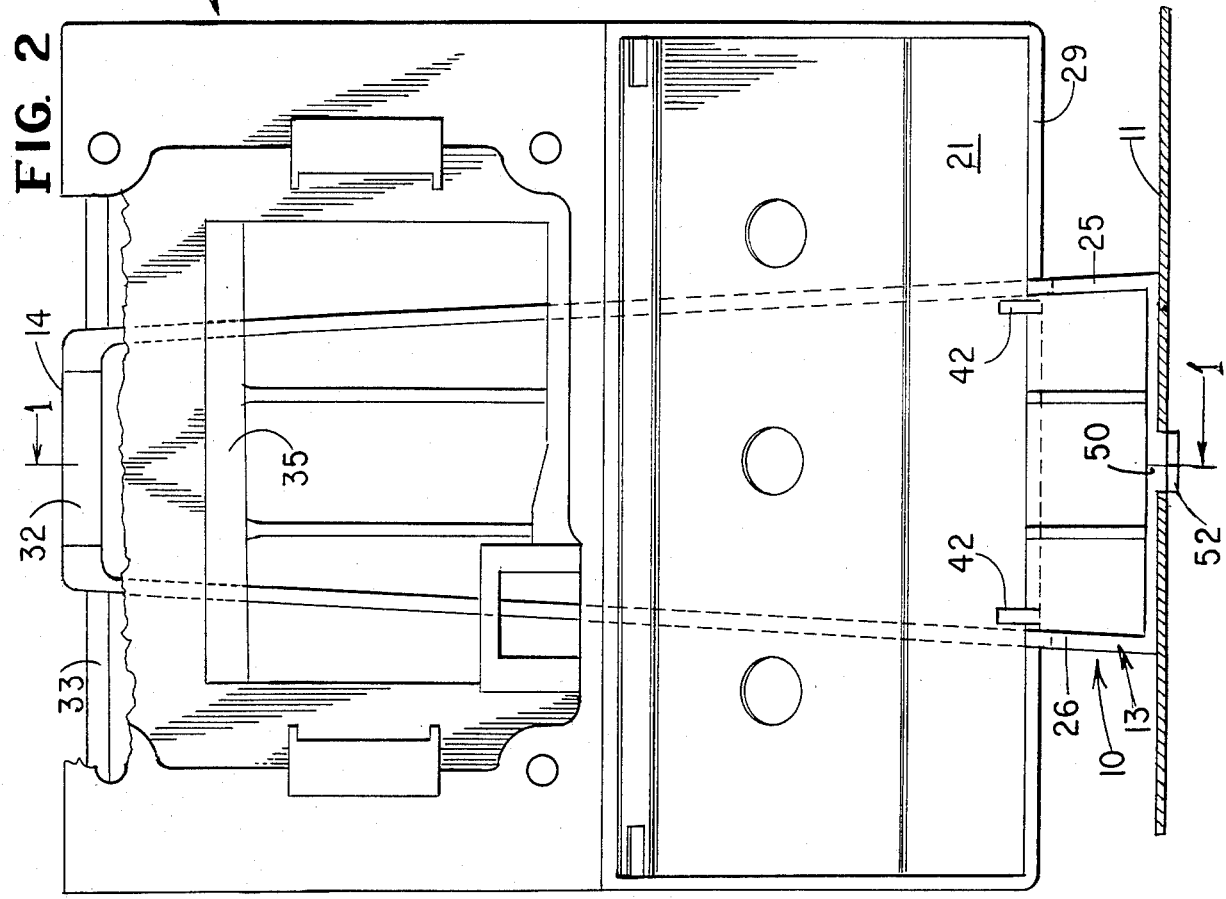

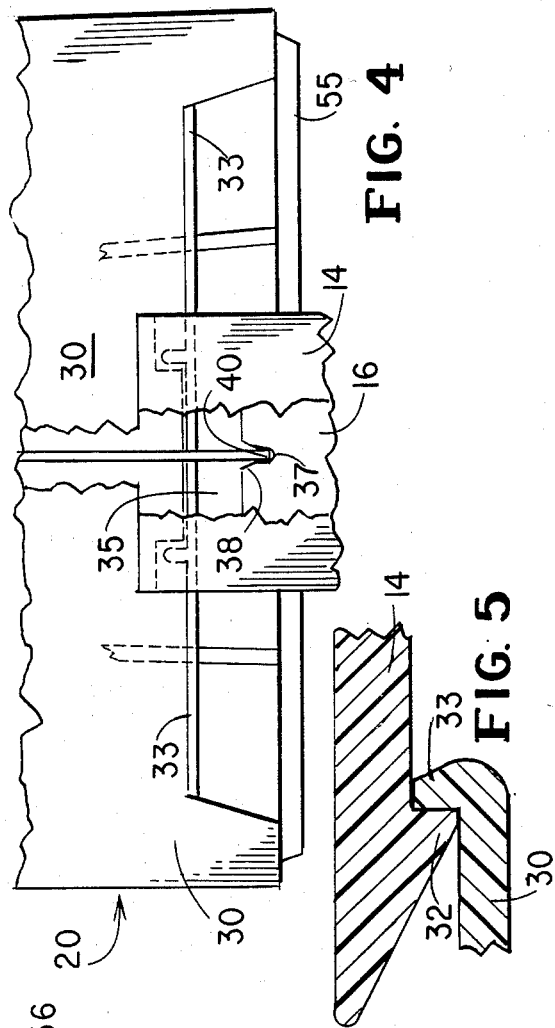
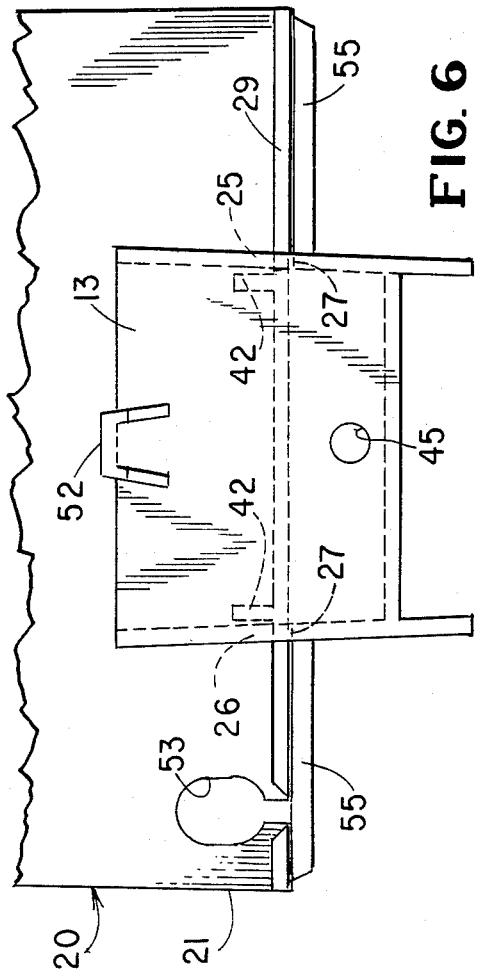
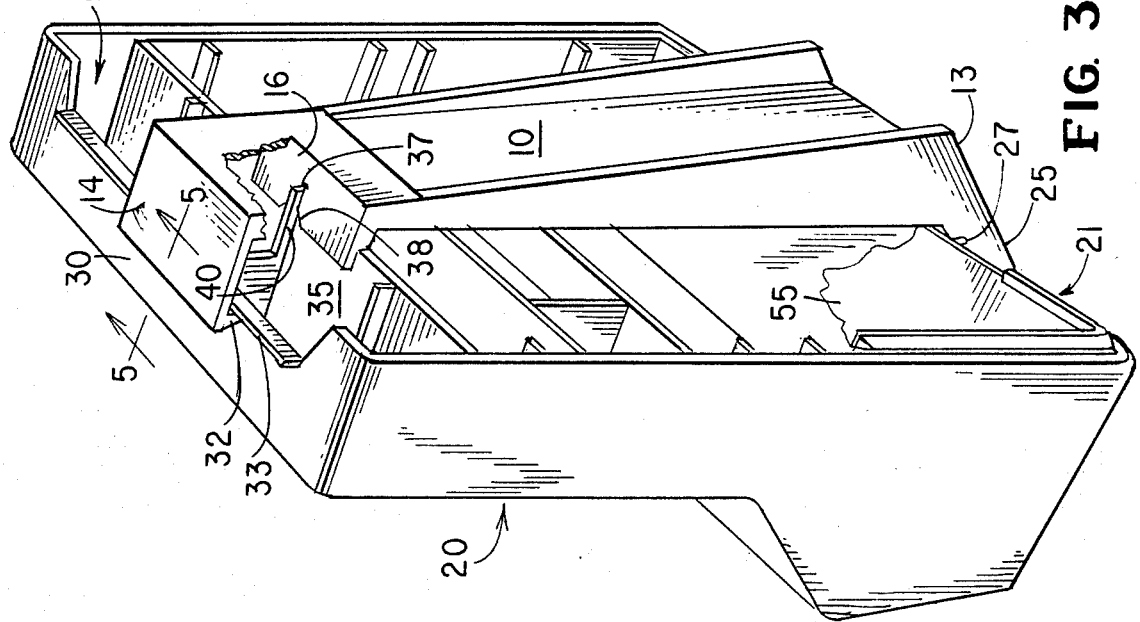

HOUSING HOLDER AND COOPERATING DETACHABLE HOUSING

This invention relates to a housing holder and a cooperating detachable housing, for example, a meter housing, and more particularly to a holder and housing respectively made essentially of plastic material.

The two components of this invention each are basically unitary in construction, and respectively provide numerous desirable structural and functional features that are otherwise difficult, costly, or impossible to attain.

The closest prior art known to applicants is the structure heretofore used by applicants' assignee in commercial products such as the housings for its Series 800 Meters, and a meter tray therefor identified as No. KRA447 Meter Tray. The meter housings and the meter tray are illustrated on pages 272 and 273 of the March, 1980 Catalog of applicants' assignee.

The meter housings heretofore used were made from numerous sheet metal and other metal parts, and involve complicated and difficult assembly problems, high manufacturing cost, absence of esthetic styling, and electrical problems due to the conductivity of the metal components. A meter housing of the type under consideration requires a handle for portability, a battery retaining compartment, a printed circuit board compartment and retaining means, a readily removable and easily attachable rear panel for the housing, a compartment and retaining means for the meter unit or the like and means for easily attaching and detaching the housing with respect to the housing holder.

In the prior art arrangement the meter housings are clamped within a meter tray, and are not readily removable therefrom when it is desired to use one or more of the meters in a remote location.

A primary object of this invention, therefore, is to provide an effective housing holder adapted to be mounted rigidly on a suitable support, for example the upper shelf of a movable roll stand. The holder is unitary in construction, except for a conventional fastener which secures the holder to the support.

Another object of the invention is to provide a cooperating detachable housing which likewise is more or less unitary in construction, and makes provision for the various structural features enumerated above with reference to the prior constructions.

A further object is to provide integral structure on the holder and housing which permits ready attachment and detachment of the housing with respect to the holder. The holder and housing have rigid interlocking parts and, in addition, the holder has a resilient part which interlocks with a cooperating part on the housing. With this arrangement, the housing simply "snaps" into attaching relation with the holder, and simple manual actuation of the resilient interlocking means on the holder enables the housing readily to be detached.

Another object is to form both the holder and the detachable housing of suitable plastic material, as by the injection molding process or other similar process.

BRIEF SUMMARY OF THE INVENTION

The housing holder of the invention is elongated or post-like in shape and adapted to be mounted rigidly on a suitable support. The holder includes an integral rigid foot portion and an integral resilient head portion generally aligned with, and spaced from, the foot portion. Means for mounting the holder on a support are associated with the foot portion. Both the rigid foot portion and the resilient head portion of the holder have interlocking means that engage counterpart means on a cooperating housing which also forms a part of the invention.

In more detailed aspect, the holder of the invention also includes a rigid shelf portion spaced from the resilient head portion, and this shelf portion is so located as to overlie and generally engage a rigid partition forming part of the cooperating housing, whereby the rigid foot portion and the rigid shelf portion of the holder cooperate to enhance the attaching relation between the housing and the holder. Thus, the resilient head portion of the holder positions and maintains the housing so the shelf portion of the holder and the partition of the housing are in effective attaching relation with each other.

The foot portion of the holder is secured to a suitable support by means of a fastener passing through openings in the foot portion and the support, and also by a boss extending downwardly from the foot portion and adapted to enter an opening in the support. The boss, which is spaced from the fastener, advantageously has a lip adapted to underlie the support, thereby further enhancing rigid relation between holder and support.

The cooperating detachable housing forming the other part of this invention may have various uses, and, by way of example, the housing here illustrated is designed for any one of a series of portable meters used in automotive testing apparatus.

The illustrated housing has integral compartments for mounting a meter or an LCD readout device, a printed circuit board and batteries. The housing also has integral guiding and holding means for the printed circuit board, and integral retaining means for the batteries. A removable rear panel closes a portion of the otherwise open rear of the housing, and the housing portion unclosed by the rear panel provide an access opening enabling the housing top to serve as a self-contained handle for the housing when the latter is disengaged from the holder for use closer to a work area.

Other objects, advantages and details of the invention will become apparent as the description proceeds, reference being had to the accompanying drawings wherein one form of the invention is shown. It will be understood that the description and drawing are illustrative only, and that the scope of the invention is to be measured by the appended claims.

BRIEF DESCRIPTION OF THE DRAWINGS

FIG. 1 is a vertical sectional view, partly broken away, of the holder and attached housing taken generally on line 1—1 of FIG. 2, the holder being shown mounted on a support.

FIG. 2 is a front elevational view, partly broken away, of the holder and housing shown in FIG. 1.

FIG. 3 is a rear perspective view of the holder and housing of the invention, certain parts being broken away to illustrate significant details of construction.

FIG. 4 is a fragmentary top view, partly broken away, of the holder and attached housing of the invention.

FIG. 5 is an enlarged fragmentary sectional view taken generally on line 5—5 of FIG. 3.

FIG. 6 is a fragmentary bottom view of the holder and housing of the invention.

DETAILED DESCRIPTION

Referring now to the drawings, FIGS. 1–3, particularly FIG. 3, best illustrate the housing holder and the cooperating detachable housing in attached relation. As previously mentioned, the holder and housing respectively are formed of suitable plastic material.

The holder of the invention, generally designated 10, is elongated or post-like in overall shape, and is adapted to be mounted more or less rigidly on a suitable support 11 (FIGS. 1 and 2) which may be the upper shelf of a conventional roll cart (not shown). The illustrated arrangement for mounting holder 10 to support 11 will be described later.

Holder 10 includes an integral rigid foot portion 13 and an integral resilient head portion 14 generally aligned with and spaced from foot portion 13. The illustrated holder 10 also includes an integral rigid shelf portion 16 located in spaced relation below head portion 14. Shelf portion 16 will be referred to later in connection with cooperating structure forming part of the detachable housing.

The invention also includes a cooperating detachable housing, generally designated 20, which is sized to be accommodated between and engaged by foot portion 13 and head portion 14 of holder 10, as best shown in FIGS. 1–3.

Rigid foot portion 13 of holder 10 and the bottom portion 21 of housing 20 have cooperating interlocking means which assist in attaching housing 20 to holder 10. As shown, the interlocking means on foot portion 13 includes a pair of laterally spaced upstanding integral flanges 25 and 26 (FIG. 2), each of the flanges having an upwardly facing slot 27 therein, best shown in FIGS. 1 and 3. The two slots 27 in flanges 25 and 26 are aligned laterally.

The interlocking means on bottom portion 21 of housing 20 which cooperates with the upstanding flanges 25 and 26 and the slots 27 therein of holder 10 is an integral rib 29, best shown in FIG. 1, which extends downwardly from bottom portion 21 of housing 10 and enters the slots 27.

Resilient head portion 14 of holder 10 and the top portion 30 of housing 20 have cooperating interlocking means which also assist in attaching housing 20 to holder 10. As shown, this interlocking means on resilient head portion 14 is an integral downwardly extending latching rib 32, best shown in enlarged FIG. 5. Latching rib 32 also is shown in FIGS. 1–3, while the cooperating interlocking means on housing 20 includes an upwardly extending flange 33, best shown in FIGS. 3 and 5. Flange 33, however, also is shown in FIGS. 1, 2 and 4.

Referring next to FIGS. 1, 3 and 4, housing 20 has a cooperating rigid partition 35 located to underlie and engage previously mentioned shelf portion 16 on holder 10. Rigid shelf portion 16 and rigid partition 35 are well shown in FIGS. 1 and 3 in relation to each other when housing 20 is attached to holder 10. As will be understood, rigid shelf portion 16 on holder 10, rigid partition 35 on housing 20 and the cooperating interlocking means on housing 20 (depending flange 29) and on foot portion 13 of holder 10 (slots 27 in flanges 25 and 26) establish an attaching relation between housing 20 and holder 10. Accordingly, resilient head portion 14 of holder 10 with its latching rib 32, and the cooperating flange 33 on top portion 30 of housing 20 cooperate to maintain the proper attaching relation between housing and holder. In other words, when shelf portion 16 and partition 35 are provided and engaged, the primary function of the resilient head portion 14 simply is to maintain proper relationship between the other parts which actually carry the attaching load.

Referring to FIGS. 3 and 4, it will be noted that rigid shelf portion 16 on holder 10 has a central slot 37 therein, the mouth of slot 37 being enlarged in tapering manner as shown at 38. Cooperating partition 35 on housing 20 has an upstanding central rib 40 adapted to enter slot 37 when housing 20 is attached to holder 10. The slot 37 and rib 40 cooperate to provide proper centering when housing 20 is attached to holder 10.

A centering arrangement also is provided as between foot portion 13 of holder 10 and bottom portion 21 of housing 20. Referring to FIGS. 2 and 6, spaced tabs 42 project downwardly from bottom portion 21 of housing 20. These tabs 42 are so spaced that they engage, or nearly engage, the inner surfaces of upstanding flanges 25 and 26 on foot portion 13 of holder 10. Thus, tabs 42 and the flanges 25 and 26 cooperate to provide a centering function which in turn establishes proper alignment with the centering arrangement just described in connection with slotted holder shelf portion 16 and the ribbed housing partition 35.

Referring again to FIGS. 1 and 2, and to the illustrated arrangement for mounting holder 10 to support 11, foot portion 13 has an aperture 45, best shown in FIGS. 1 and 6, and a fastener 46 extends through aperture 45 and an aligned aperture 47 in support 11. A wing nut 48 or the like cooperates with fastener 46 to secure holder 10 to support 11. In order positively to prevent holder 10 from twisting or tilting with respect to support 11, foot portion 13 of holder 10 has a downwardly extending boss 50 (FIGS. 1 and 2) spaced from fastener 46, the boss 50 entering an aligned aperture 51 in support 11. Boss 50 desirably has a securing lip 52 adapted to underlie support 11, as best shown in FIG. 1.

Referring to FIG. 6, bottom portion 21 of housing 20 has an aperture 53 for the electrical cable leading to the meter or other device in housing 20.

Housing 20, as shown, is provided with a removable rear panel 55 of any suitable material, such as plastic, metal, plastic on metal, or the like. As shown in FIG. 1, the rear panel 55 closes that portion of the open rear of housing 20 between rigid partition 35 and the housing bottom portion 21, panel 55 extending from side to side of housing 20 as shown in FIG. 6.

The portion of the rear of housing 20 between partition 35 and housing top 30 unclosed by panel 55 provides an access opening 56 (FIGS. 1 and 3) enabling housing top 30 to serve as a self-contained handle for housing 20 when the latter is detached from holder 10 to be used in more convenient relation with a work area. As shown in FIG. 1, removable rear panel 55 is detachably secured to housing 20 by means of a fastener 60 that extends through panel 55 into effective relation with a securing means 61 mounted within housing 20. Securing means 61 may be a simple bayonet latching arrangement whereby fastener 60 is engaged and disengaged by a quarter turn.

From the above description, it is believed that the construction and advantages of the invention will be readily apparent to those skilled in the art. Various changes in detail may be made without departing from the spirit or losing the advantages of the invention.

Having thus described the invention, what is claimed as new and desired to be secured by Letters Patent is:

1. A housing holder and cooperating detachable housing, comprising an elongated holder adapted to be mounted on a support, said holder including an integral rigid foot portion and an integral resilient head portion generally aligned with and spaced from said foot portion, a cooperating detachable housing sized to be accommodated between and engaged by said foot and head portions of said holder, cooperating interlocking means on said rigid foot portion and said housing, cooperating interlocking means on said resilient head portion and said housing, whereby flexing of said resilient head portion readily establishes and releases interlocking relation of said respective cooperating interlocking means and thus the attachment and detachment of said holder and said housing, an integral rigid shelf portion on said holder spaced below said head portion, a cooperating rigid partition on said housing located to underlie said shelf portion when said housing is attached to said foot and head portions, and a removable rear panel closing that portion of the open rear of said housing between said rigid partition and the housing bottom, the unclosed portion of the housing rear between said partition and the housing top providing an access opening enabling the housing top to serve as a self-contained handle for said housing.

2. A housing holder and cooperating detachable housing, comprising an elongated holder adapted to be mounted on a support, said holder including an integral rigid foot portion and an integral resilient head portion generally aligned with and spaced from said foot portion, a cooperating detachable housing sized to be accommodated between and engaged by said foot and head portions of said holder, cooperating interlocking means on said rigid foot portion and said housing, cooperating interlocking means on said resilient head portion and said housing, whereby flexing of said resilient head portion readily establishes and releases interlocking relation of said respective cooperating interlocking means and thus the attachment and detachment of said holder and said housing, an integral rigid shelf portion on said holder spaced below said head portion, a cooperating rigid partition on said housing located to underlie and engage said shelf portion when said housing is attached to said foot and head portions, whereby said rigid shelf portion and said rigid partition and said cooperating interlocking means on said rigid foot portion and said housing establish an attaching relation between said housing and said holder, and whereby said resilient head portion cooperates to maintain the attaching relation, and a removable rear panel closing that portion of the open rear of said housing between said rigid partition and the housing bottom, the unclosed portion of the housing rear between said partition and the housing top providing an access opening enabling the housing top to serve as a self-contained handle for said housing.

* * * * *